(12) United States Patent
Kim et al.

(10) Patent No.: US 11,073,977 B2
(45) Date of Patent: *Jul. 27, 2021

(54) METHOD FOR SETTING DATE AND TIME BY ELECTRONIC DEVICE AND ELECTRONIC DEVICE THEREFOR

(71) Applicant: SAMSUNG ELECTRONICS CO., LTD., Suwon-si (KR)

(72) Inventors: Eun-Sun Kim, Namyangju-si (KR); Seung-Gu Kang, Suwon-si (KR); Ji-Hee Kim, Seoul (KR); Gu-Hyun Yang, Seoul (KR); Sue-Jung Oh, Seongnam-si (KR); Seung-Won Lee, Suwon-si (KR); Seong-Ho Cho, Seoul (KR); Jong-Keun Cho, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,604

(22) Filed: Feb. 24, 2020

(65) Prior Publication Data

US 2020/0192562 A1    Jun. 18, 2020

Related U.S. Application Data

(63) Continuation of application No. 15/387,175, filed on Dec. 21, 2016, now Pat. No. 10,572,131, which is a
(Continued)

(30) Foreign Application Priority Data

Nov. 6, 2015 (KR) .................. 10-2015-0155827

(51) Int. Cl.
*G06F 3/041* (2006.01)
*G06F 3/0484* (2013.01)
(Continued)

(52) U.S. Cl.
CPC .......... *G06F 3/04847* (2013.01); *G04G 5/04* (2013.01); *G04G 11/00* (2013.01); *G04G 21/02* (2013.01);
(Continued)

(58) Field of Classification Search
CPC .... G06F 3/0416; G06F 3/041; G06F 3/04847; G06F 3/04817; G06F 1/163; G06F 3/0484; G06F 3/048
See application file for complete search history.

(56) References Cited

U.S. PATENT DOCUMENTS 4,837,731 A    6/1989 Levine et al.
8,452,346 B1   5/2013  Lin
(Continued)

FOREIGN PATENT DOCUMENTS

KR    10-2015-0019875    2/2015
KR    10-2015-0062761    6/2015
KR    10-2017-0008041    1/2017

OTHER PUBLICATIONS

Office Action dated Nov. 2, 2018 in U.S. Appl. No. 15/344,916.
(Continued)

*Primary Examiner* — Nhat Huy T Nguyen
(74) *Attorney, Agent, or Firm* — Nixon & Vanderhye, P.C.

(57) ABSTRACT

According to various disclosed embodiments, a method for setting a date and time by an electronic device may include: displaying a user interface that includes a plurality of time points arranged at regular intervals along a circumferential direction in an edge area of a substantially circular dial and including a date change point, a first icon positioned at a first point among the plurality of time points, and a second icon positioned at a second point among the plurality of time points; receiving an input for at least one of the first icon and
(Continued)

the second icon; displaying movement of the at least one of the first icon and the second icon on the plurality of time points based on the received input; and displaying a date and time corresponding to a movement direction and movement location of the at least one of the first icon and the second icon.

24 Claims, 11 Drawing Sheets

Related U.S. Application Data continuation of application No. 15/344,916, filed on Nov. 7, 2016.

(51) Int. Cl.

| | |
|---|---|
| G06F 3/048 | (2013.01) |
| G04G 21/08 | (2010.01) |
| G04G 21/02 | (2010.01) |
| G04G 11/00 | (2006.01) |
| G04G 5/04 | (2006.01) |
| G06F 3/0481 | (2013.01) |
| G06F 3/0488 | (2013.01) |

(52) U.S. Cl.
CPC ........... *G04G 21/025* (2013.01); *G04G 21/08* (2013.01); *G06F 3/04817* (2013.01); *G06F 3/04845* (2013.01); *G06F 3/04883* (2013.01)

(56) References Cited

U.S. PATENT DOCUMENTS

| | | | |
|---|---|---|---|
| 8,562,754 B2 * | 10/2013 | Koch | A47L 15/0021 |
| | | | 134/57 D |
| 8,650,507 B2 | 2/2014 | Westerman | |
| 2004/0151076 A1 | 8/2004 | Fidel | |
| 2008/0205198 A1 * | 8/2008 | Sherman | G04B 45/0092 |
| | | | 368/62 |
| 2012/0060166 A1 | 3/2012 | Jardine et al. | |
| 2013/0027412 A1 | 1/2013 | Roddy | |
| 2013/0129308 A1 | 5/2013 | Karn | |
| 2013/0170324 A1 | 7/2013 | Tu | |
| 2014/0092035 A1 * | 4/2014 | Su | G06F 3/04847 |
| | | | 345/173 |
| 2014/0219066 A1 | 8/2014 | Sadilek | |
| 2015/0049033 A1 | 2/2015 | Kim et al. | |
| 2015/0205509 A1 | 7/2015 | Scriven et al. | |
| 2016/0249831 A1 | 9/2016 | Eastman et al. | |
| 2017/0017355 A1 | 1/2017 | Lim et al. | |

OTHER PUBLICATIONS

Final Office Action dated Apr. 15, 2019 in U.S. Appl. No. 15/344,916.
Office Action dated Oct. 3, 2019 in U.S. Appl. No. 15/344,916.

* cited by examiner

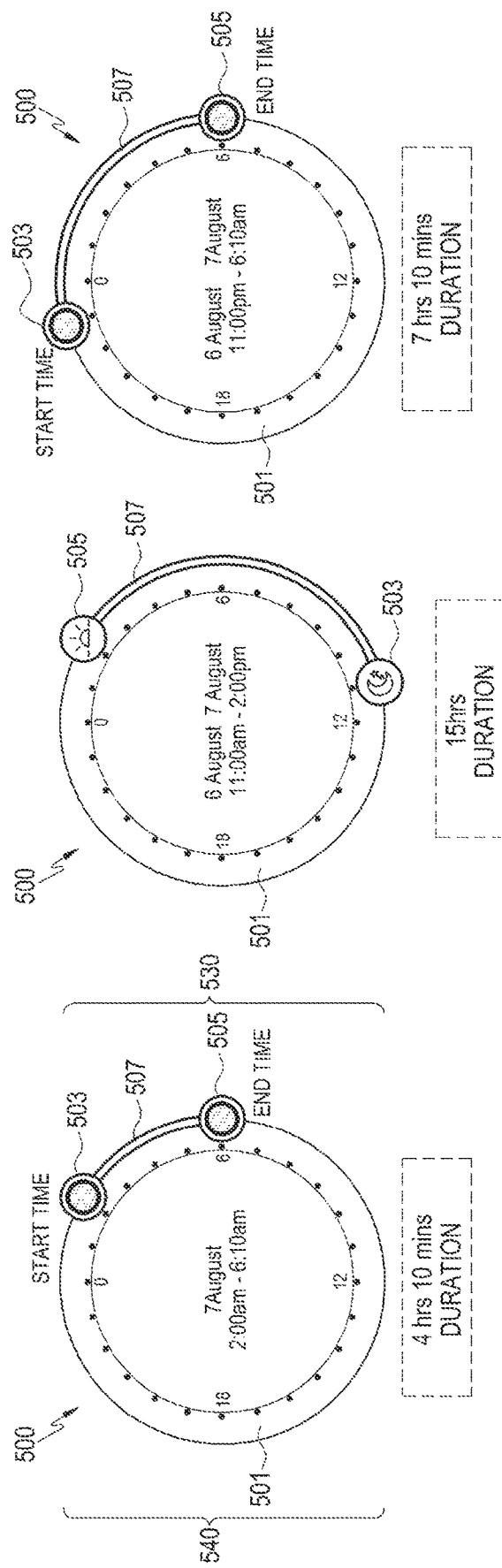

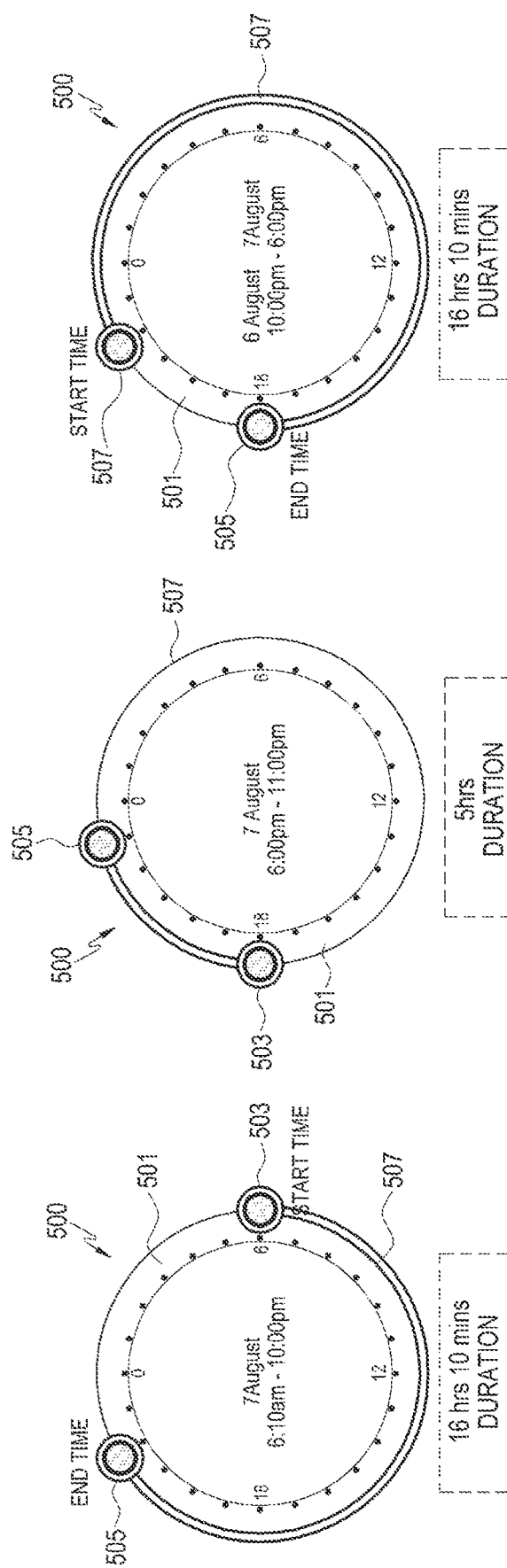

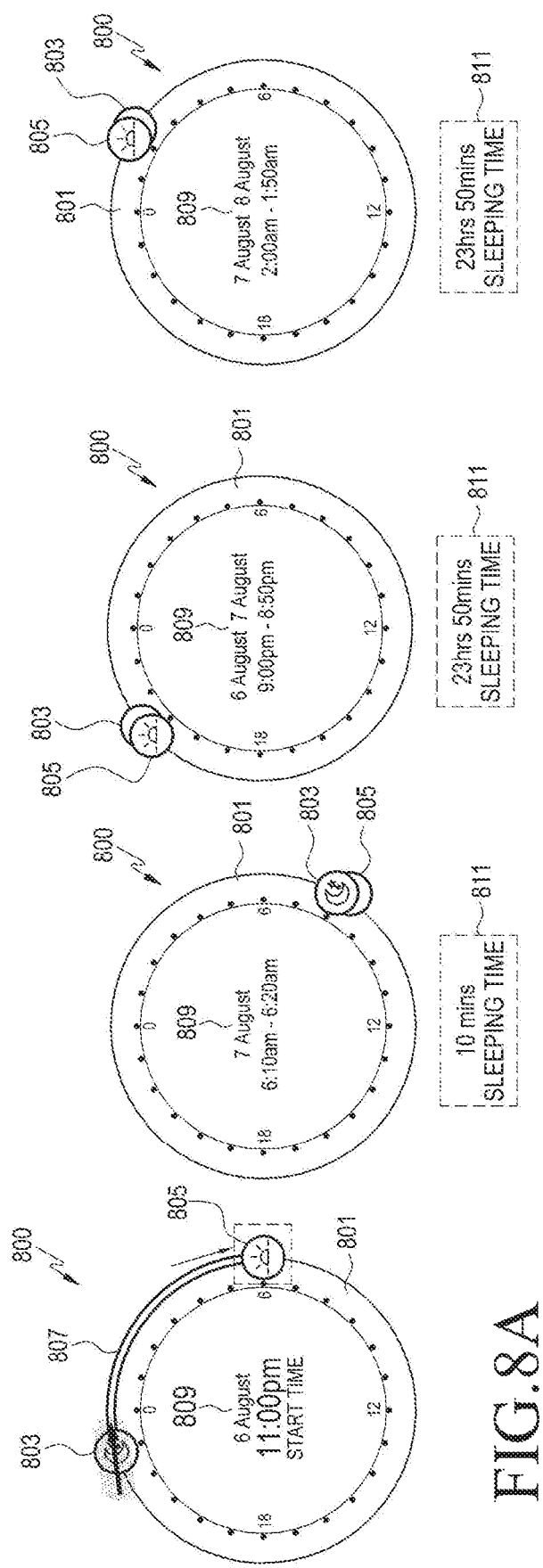

METHOD FOR SETTING DATE AND TIME BY ELECTRONIC DEVICE AND ELECTRONIC DEVICE THEREFOR

CROSS-REFERENCE TO RELATED APPLICATIONS

This application is a continuation of U.S. application Ser. No. 15/387,175, filed on Dec. 21, 2016, now U.S. Pat. No. 10,572,131, which is a continuation of U.S. application Ser. No. 15/344,916, filed Nov. 7, 2016, which is based on and claims priority under 35 U.S.C. § 119 to Korean Application Serial No. 10-2015-0155827, which was filed in the Korean Intellectual Property Office on Nov. 6, 2015. The disclosures of each of these applications are incorporated by reference herein in their entireties.

TECHNICAL FIELD

The present disclosure relates generally to a method for setting a date and time by an electronic device and an electronic device therefor.

BACKGROUND

Recently, use of electronic devices, such as a tablet PC, a smart phone, and a smart watch has been popularized, and, in relation to the electronic devices, various functions such as a wireless communication function, a music function, a moving image function, and a game function have been developed and applied thereto. A display is provided on a front surface of the electronic devices for effectively using the various functions. For example, a recent smart phone is provided with a display (e.g. a touch screen), a front surface part of which responds to a touch.

Further, various applications may be installed and executed in the electric devices. For example, the applications may include an application for schedule management, an application for health care, etc. The applications can set a time period through an input of a start date, a start time, an end date, and an end time.

Conventionally, when an electronic device executes a particular function (or a particular application) and then sets a time period, the electronic device may set the time period by inputting (or adjusting) a start date, a start time, an end date, and an end time, respectively. Therefore, conventionally, when the electronic device executes a particular function and then sets a time period, many user inputs are required by the electronic device.

SUMMARY

Various example embodiments provide a method for setting a date and time by an electronic device and an electronic device therefor, which can minimize and/or reduce, when the electronic device sets a time period by executing a particular function, a user input and set the time period, and can display the set time period so as to be intuitively identified by a user.

A method for setting a date and time by an electronic device according to an example embodiment may include: displaying a user interface that includes a plurality of time points arranged at regular intervals along a circumferential direction in an edge area of a substantially circular dial and including a date change point, a first icon positioned at a first point among the plurality of time points, and a second icon positioned at a second point among the plurality of time points; receiving an input for at least one of the first icon and the second icon; displaying movement of the at least one of the first icon and the second icon on the plurality of time points based on the received input; and displaying a date and time corresponding to a movement direction and movement location of the at least one of the first icon and the second icon.

An electronic device according to an example embodiment may include: a display configured to display a user interface, the user interface including a plurality of time points arranged at regular intervals along a circumferential direction in an edge area of a substantially circular dial and including a date change point, a first icon positioned at a first point among the plurality of time points, and a second icon positioned at a second point among the plurality of time points; input circuitry configured to receive an input for at least one of the first icon and the second icon; a processor configured to control display movement of the at least one of the first icon and the second icon on the plurality of time points based on the received input and to display a date and time corresponding to a movement direction and movement location of the at least one of the first icon and the second icon.

A method for setting a date and time by an electronic device and an electronic device therefor according to various example embodiments can minimize and/or reduce a user input to set a time period, when the electronic device executes a particular function and then sets the time period. For example, when an electronic device executes a particular function and sets a time period, the electronic device can input a start date and a start time at one time, and can input an end date and an end time at one time. Further, the electronic device can display the set time period so as to be intuitively identified by a user.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein:

FIGS. 5A, 5B, 5C, 5D, 5E and 5F are diagrams illustrating example initial time and initial date setting of a first icon and a second icon of a user interface according to various embodiments;

FIGS. 8A, 8B, 8C, 8D, 8E, 8F and 8G are diagrams illustrating example date and time setting by an electronic device according to various example embodiments.

DETAILED DESCRIPTION

Figure 1:
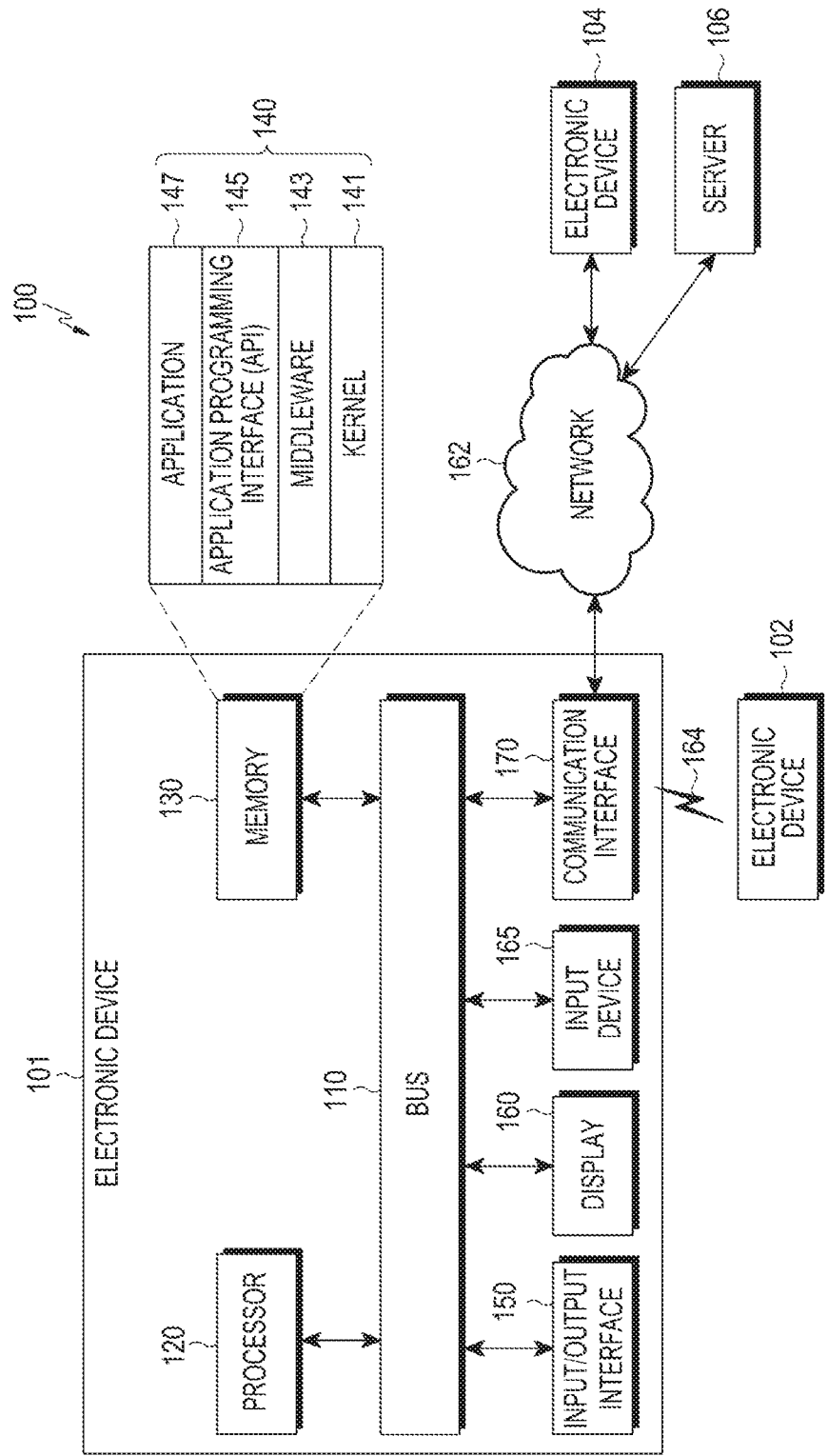
FIG. 1 is a diagram illustrating an example network environment including electronic devices according to various example embodiments.

Hereinafter, various example embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g. numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g. first element) is referred to as being (operatively or communicatively) "connected," or "coupled," to another element (e.g. second element), it may be directly connected or coupled directly to the other element or any other element (e.g. third element) may be interposer between them. In contrast, it may be understood that when an element (e.g. first element) is referred to as being "directly connected," or "directly coupled" to another element (second element), there are no element (e.g. third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer, for example, to a situation in which the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g. central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory typer (e.g. a watch, a ring, a bracelet, an anklet, a necklace, a glasses, a contact lens, or a Head-Mounted Device (HMD)), a fabric or clothing integrated type (e.g. an electronic clothing), a body-mounted type (e.g. a skin pad, or tattoo), and a bio-implantable type (e.g. an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g. Samsung HomeSync™, Apple TV™, or Google TV™), a game console (e.g. Xbox™ and PlayStation™), an electronic dictionary, an electronic key, a camcorder, and an electronic photo frame, or the like, but is not limited thereto.

According to another embodiment, the electronic device may include at least one of various medical devices (e.g. various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g. a navigation device for a ship, and a gyro-compass), avionics, security devices, an automotive head unit, a robot for home or industry, an automatic teller's machine (ATM) in banks, point of sales (POS) in a shop, or internet device of things (e.g. a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g. a water meter, an electric meter, a gas meter, and a radio wave meter), or the like, but is not limited thereto. In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g. an artificial intelligence electronic device) using an electronic device.

Referring to FIG. 1, an electronic device within a network environment 100 according to various example embodiments will be described. The electronic device 101 may include a bus 110, a processor 120, a memory 130, an input/output interface (e.g., including input/output circuitry) 150, a display 160, an input device (e.g., including input circuitry) 165, and a communication interface (e.g., including communication circuitry) 170. In some embodiments, the electronic device 101 may omit at least one of the elements, or may further include other elements.

The bus 110 may include, for example, a circuit that interconnects the elements 110 to 170 and delivers communication (e.g. a control message and/or data) between the elements 110 to 170.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101.

According to various embodiments, the processor 120 may determine a date and time, which is to be displayed on the display 160, corresponding to each of a first icon and a second icon of a user interface by using at least one of information in the memory 130 and setting information received from the outside through the communication interface 170. The information in the memory 130 may be one among initial setting information preset in the electronic device 101, user setting information preset according to a user operation, log information of the electronic device, and date and time setting pattern analysis information. The received setting information may be, for example, setting information received from an external electronic device 104 or a server 106.

Further, the processor 120 may predetermine a first point and a second point, which correspond to a location of the first icon and a location of the second icon, respectively, according to the determining of the date and time corresponding to the first icon and the date and time corresponding to the second icon.

The user interface may include: a plurality of time points which are arranged at regular intervals along a circumferential direction in an edge area of a circular dial and includes a date change point; a first icon positioned at a first point among the plurality of time points; and a second icon positioned at a second point among the plurality of time points.

According to various embodiments, the processor 120 may control the display 160 to display the user interface. Further, the processor 120 may control to receive an input for at least one of the first icon and the second icon of the user interface, displayed on the display 160, through the input device 165. Further, the processor 120 may display movement of at least one of the first icon and the second icon on the plurality of time points and to display according to the received input, and may perform a control so that a date and time corresponding to a movement direction and a movement location of the at least one of the first icon and the second icon is displayed.

According to various embodiments, the user interface may display a date and time corresponding to a location of the first icon and a date and time corresponding to a location of the second icon. Further, the date and time, which has been displayed by the user interface, corresponding to at least one of the location of the first icon and the location of the second icon, may be changed on the basis of a movement direction and movement location of at least one of the first icon and the second icon.

According to various embodiments, the input may be a gesture that moves, after touching at least one the first icon and the second icon by using a user finger or a touch tool, the finger or the touch tool to another point among the plurality of time points while maintaining the touching.

According to various embodiments, the processor 120 may change a time displayed to correspond to a location of at least one of the first icon and the second icon so that the time corresponds to a movement location of the at least one of the first icon and the second icon. Further, when movement of the at least one of the first icon and the second icon in a first direction via the date change point is displayed, the processor 120 may perform a control so that a date displayed to correspond to the location of the at least one of the first icon and the second icon is changed to a date obtained by adding one day to the date displayed to correspond to the location of the at least one of the first icon and the second icon.

According to various embodiments, when movement of at least one of the first icon and the second icon in a second direction opposite to the first direction via the date change point is displayed, the processor 120 may perform a control so that a date displayed to correspond to a location of the at least one of the first icon and the second icon is changed to a date obtained by subtracting one day from the date displayed to correspond to the location of the at least one of the first icon and the second icon.

According to various embodiments, when displaying dates corresponding to a location of the first icon and a location of the second icon and when the dates corresponding to the location of the first icon and the location of the second icon are identical, the processor 120 may control only one date to be displayed in a designated area of the user interface.

According to various embodiments, the plurality of time points may correspond to a 24-hour range.

According to various embodiments, the processor 120 may perform a control so that a duration from a date and time corresponding to a location of the first icon to a date and time corresponding to the location of the second icon is displayed.

According to various embodiments, when movement of the first icon in a first direction on the plurality of time points is displayed and when an interval between a location point of the first icon and a location point of second icon becomes a preset reference interval, the processor 120 may stop the movement of the first icon. Further, when movement of the second icon in a second direction on the plurality of time points is displayed and when the interval between the location point of the first icon and the location point of second icon becomes the preset reference interval, processor 120 may stop the movement of the second icon.

Further, the processor 120 may perform a control so that a user interface indicating that the first icon and the second icons cannot cross each other is displayed, when the movement of the first icon is stopped and then an input for moving the first icon in the first direction is received or when the movement of the second icon is stopped and then an input for moving the second icon in the second direction is received.

According to various embodiments, when movement of the first icon in a first direction on the plurality of time points is displayed and when an interval between a location point of the first icon and a location point of second icon becomes a preset reference interval, the processor 120 may control the first icon and the second icon to simultaneously move in the first direction while maintaining the reference interval. Further, when movement of the second icon in a second direction on the plurality of time points is displayed and when the interval between the location point of the first icon and the location point of second icon becomes the preset reference interval, the processor 120 may control the first icon and the second icon to simultaneously move in the second direction while maintaining the reference interval.

According to various embodiments, the processor 120 may perform a control so that a line that makes a connection from the first icon to the second icon is displayed in a time elapse direction on the plurality of time points. Further, the processor 120 may performs a control so that movement of the line according to an input reception for the line through the input device 165 is display and simultaneously the first icon and the second icon move together.

According to various embodiments, when the second point is a point of a first interval, which is an interval from a time point at midnight corresponding to the date change point to a time point before noon, among the plurality of time points, and the first point is a point of an interval before the second point within the first interval, a date corresponding to a location of the first icon and a date corresponding to a location of the second icon may be identical. Further, when the second point is a point of the first interval among the plurality of time points and the first point is a point of an interval after the second point within the first interval, the date corresponding to the location of the first icon may be one day earlier than the date corresponding to the location of the second icon. Further, when the second point is a point of the first interval and the first point is a point of a second interval, which is an interval from a time point at noon to a time point before midnight, the date corresponding to the location of the first icon may be one day earlier than the date corresponding to the location of the second icon. Further, when the second point is a point of the second interval and the first point is a point of the first interval, the date corresponding to the location of the first icon and the date corresponding to the location of the second icon may be identical. Further, when the second point is a point of the second interval and the first point is a point of an interval before the second point within the second interval, the date corresponding to the location of the first icon and the date corresponding to the location of the second icon may be identical. Further, when the second point is a point of the second interval and the first point is a point of an interval after the second point within the second interval, the date corresponding to the location of the first icon may be one day earlier than the date corresponding to the location of the second icon.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g. the bus 110, the processor 120, or the memory 130) used for executing an operation or function implemented by other programs (e.g. the middleware 143, the API 145, or the application 147). Further, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Further, the middleware 143 may process one or more task requests, which are received from the application programs 147, according to priorities thereof. For example, the middleware 143 may assign priorities for using the system resources (e.g. the bus 110, the processor 120, the memory 130, etc.) of the electronic device 101 to at least one of the application programs 147. For example, the middleware 143 may perform scheduling or load balancing on the one or more task requests by processing the one or more task requests according to the priorities assigned to the at least one application program.

The API 145, which is an interface through which the applications 147 control functions provided from the kernel 141 or the middleware 143, may include, for example, at least one interface or function (e.g. instruction) for file control, window control, image processing, text control, etc.

The input/output interface 150, for example, may include various input/output circuitry configured to function as an interface that may forward instructions or data, which is input from a user or another external device, to the other element(s) of the electronic device 101. Further, the input/output interface 150 may output instructions or data, which are received from the other element(s) of the electronic device 101, to the user or the another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g. text, images, videos, icons, symbols, etc.) for a user. The display 160 may include a touch screen and may receive, for example, a touch, gesture, proximity, or hovering input using an electronic pen or the user's body part.

The input device 165 may include various input circuitry, such as, for example, and without limitation, a key (not shown), a button (not shown), a touch panel (not shown), a (digital) pen sensor (not shown), an ultrasonic input unit (not shown), or the like. The touch panel may use, for example, at least one of a capacitive type, a resistive type, an infrared type, and an ultrasonic type. Further, the touch panel may further include a control circuit. The touch panel may further include a tactile layer to provide a tactile reaction to a user.

The communication interface 170 may include various communication circuitry configured to perform communication, for example, between the electronic device 101 and an external device (e.g. a first external electronic device 102, a second external electronic device 104, or a server 106). For example, the communication interface 170 may include various communication circuitry connected to a network 162 through wireless or wired communication to communicate with the external device (e.g. the second external electronic device 104 or the server 106).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short range communication 164. The short range communication 164 may include, for example, at least one of WiFi, Bluetooth, Near Field Communication (NFC), Global Navigation Satellite System (GNSS), etc. The GNSS may include at least one of, for example, a Global Positioning System (GPS), a Global Navigation Satellite System (Glonass), a Beidou Navigation Satellite System (hereinafter, referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), etc. The network 162 may include at least one of a communication network such as a computer network (e.g. a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations executed in the electronic device 101 may be executed in another electronic device or a plurality of electronic devices (e.g. the electronic devices 102 and 104 or the server 106). According to an embodiment, when the electronic device 101 has to perform some functions or services automatically or in response to a request, the electronic device 101 may request another device (e.g. the electronic device 102 or 104 or the server 106) to perform at least some functions relating thereto instead of, or in addition to, performing the functions or services by itself. The other electronic device (e.g. the electronic device 102 or 104 or the server 106) may perform the requested functions or the additional functions and may transfer the execution result to the electronic device 101. The electronic device 101 may provide the received result as it is, or may additionally process the received result to provide the requested functions or services. To this end, for example, cloud computing, distributed computing, or client-server computing technology may be used.

Figure 2:
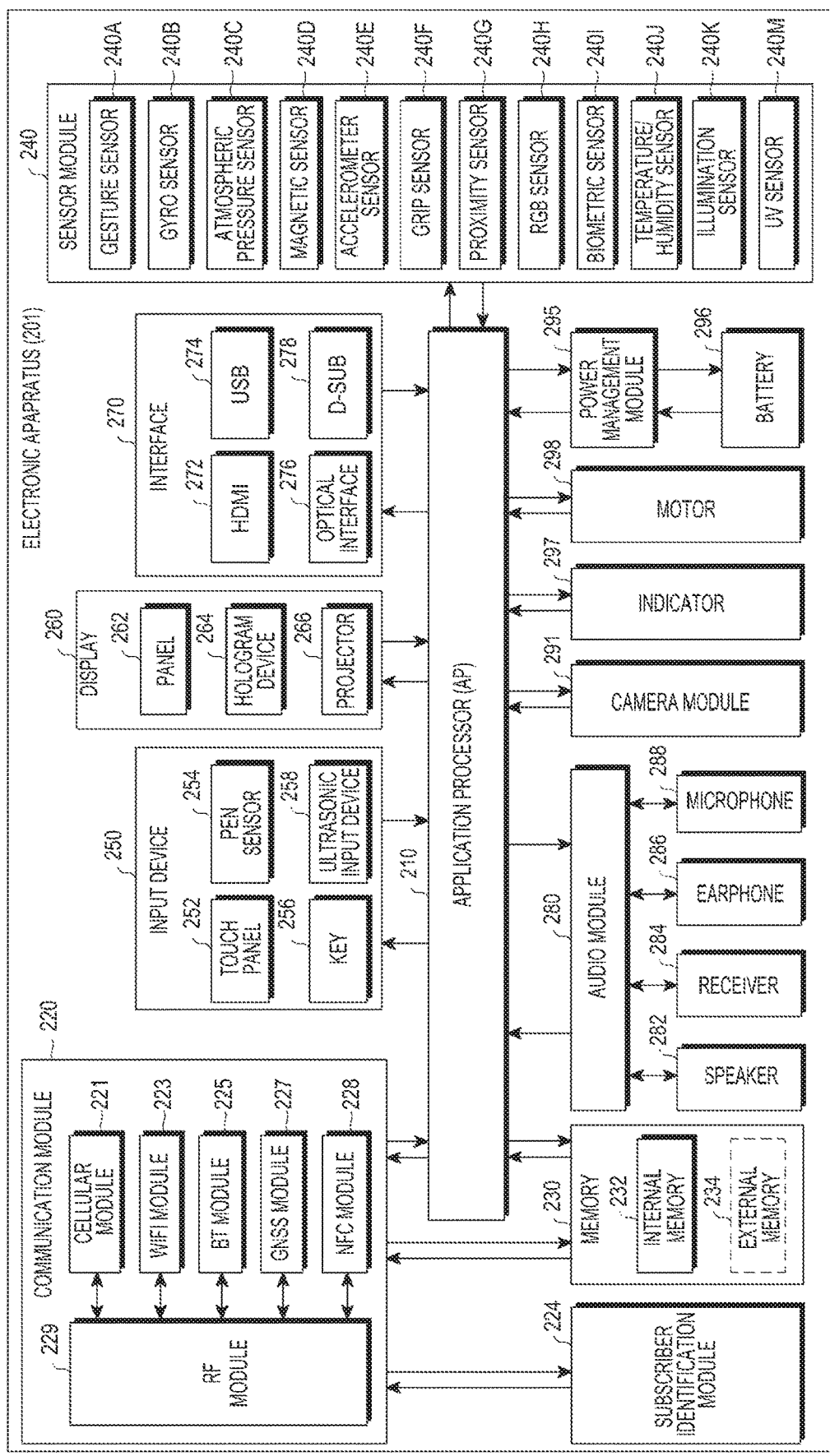
FIG. 2 is a block diagram illustrating an example electronic device according to various example embodiments.

FIG. 2 is a block diagram illustrating an example electronic device 201 according to various example embodiments. The electronic device 201 may include, for example, the whole or a part of the electronic device 101 illustrated in FIG. 1. The electronic device 201 may include at least one processor (e.g. Application Processor (AP)) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may control a plurality of hardware or software elements connected thereto and may perform various data processing and operations, by driving an operating system or an application program. The processor 210 may be embodied, for example, as a System on Chip (SoC). According to an embodiment, the processor 210 may further include a Graphic Processing Unit (GPU) and/or an image signal processor. The processor 210 may also include at least some (e.g. a cellular module 221) of the elements illustrated in FIG. 2. The processor 210 may load, in a volatile memory, instructions or data received from at least one of the other elements (e.g. a non-volatile memory) to process the loaded instructions or data, and may store various types of data in the non-volatile memory.

The communication module 220 may have a configuration equal or similar to that of the communication interface 170 of FIG. 1. The communication module 220 may include various communication circuitry, such as, for example, and without limitation, a cellular module 221, a WiFi module 223, a Bluetooth module 225, a GNSS module 227 (e.g. a GPS module, a Glonass module, a Beidou module, or a Galileo module), an NFC module 228, and a Radio Frequency (RF) module 229.

The cellular module 221 may provide, for example, a voice call, a video call, a text message service, an Internet service, etc. through a communication network. According to an embodiment, the cellular module 221 may identify and authenticate the electronic device 201 within a communication network by using the subscriber identification module 224 (e.g. a SIM card). According to an embodiment, the cellular module 221 may perform at least some of the functions that the processor 210 may provide. According to an embodiment, the cellular module 221 may include a Communication Processor (CP).

Each of the WiFi module 223, the Bluetooth module 225, the GNSS module 227, and the NFC module 228 may include, for example, a processor for processing data that is transmitted and received through the corresponding module. According to some embodiments, at least some (e.g. two or more) of the cellular module 221, the WiFi module 223, the Bluetooth module 225, the GNSS module 227, and the NFC module 228 may be included in one Integrated Chip (IC) or IC package.

The RF module 229, for example, may transmit/receive a communication signal (e.g. an RF signal). The RF module 229 may include, for example, a transceiver, a Power Amplifier Module (PAM), a frequency filter, a Low Noise Amplifier (LNA), an antenna, etc. According to another embodiment, at least one of the cellular module 221, the WiFi module 223, the Bluetooth module 225, the GNSS module 227, and the NFC module 228 may transmit/receive an RF signal through a separate RF module.

The subscriber identification module 224 may include, for example, a card including a subscriber identification module and/or an embedded SIM, and may include unique identification information (e.g. an Integrated Circuit Card Identifier (ICCID)) or subscriber information (e.g. an International Mobile Subscriber Identity (IMSI)).

The memory 230 (e.g. the memory 130) may include, for example, an internal memory 232 or an external memory 234. The internal memory 232 may include, for example, at least one of a volatile memory (e.g. a Dynamic Random Access Memory (DRAM), a Static RAM (SRAM), a Synchronous Dynamic RAM (SDRAM), and the like) and a non-volatile memory (e.g. a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g. a NAND flash memory, a NOR flash memory, and the like), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, and the like. The external memory 234 may be functionally or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g. a red, green, blue (RGB) sensor), a biometric sensor 240I, a temperature/humidity sensor 240J, a light (e.g., illumination) sensor 240K, and an ultraviolet (UV) sensor 240M. Additionally or alternatively, the sensor module 240A may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include various input circuitry, such as, for example, and without limitation, a touch panel 252, a (digital) pen sensor 254, a key 256, or an ultrasonic input unit 258. The touch panel 252 may use, for example, at least one of a capacitive type, a resistive type, an infrared type, and an ultrasonic type. Further, the touch panel 252 may further include a control circuit. The touch panel 252 may further include a tactile layer to provide a tactile reaction to a user.

The (digital) pen sensor 254 may include, for example, a recognition sheet which is a part of the touch panel or is separated from the touch panel. The key 256 may include, for example, a physical button, an optical key, or a keypad. The ultrasonic input device 258 may detect ultrasonic waves, which are generated by an input tool, through a microphone (e.g. a microphone 288) to identify data corresponding to the detected ultrasonic waves.

The display 260 (e.g. the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262, together with the touch panel 252, may be implemented as one module. The hologram device 264 may show a three dimensional image in the air by using an interference of light. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert, for example, a sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, etc.

The camera module 291 is a device that can photograph a still image and a dynamic image. According to an embodiment, the camera module 291 may include one or more image sensors (e.g. a front sensor or a rear sensor), a lens, an Image Signal Processor (ISP), or a flash (e.g. an LED, a xenon lamp, etc.).

The power management module 295 may manage, for example, the power of the electronic device 201. According to an embodiment, the power management module 295 may include a Power Management Integrated Circuit (PMIC), a charger Integrated Circuit (IC), or a battery or fuel gauge. The PMIC may have a wired and/or wireless charging method. Examples of the wireless charging method may include a magnetic resonance method, a magnetic induction method, an electromagnetic wave method, etc. Additional circuits (e.g. a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may indicate a particular state (e.g. a booting state, a message state, a charging state, and the like) of the electronic device 201 or a part (e.g. the processor 210) thereof. The motor 298 may convert an electrical signal into a mechanical vibration and may generate a vibration, a haptic effect, etc. Although not illustrated, the electronic device 201 may include a processing unit (e.g. a GPU) for supporting a mobile TV. The processing unit for supporting the mobile TV may process media data according to a standard, such as Digital Multimedia Broadcasting (DMB), Digital Video Broadcasting (DVB), or MediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
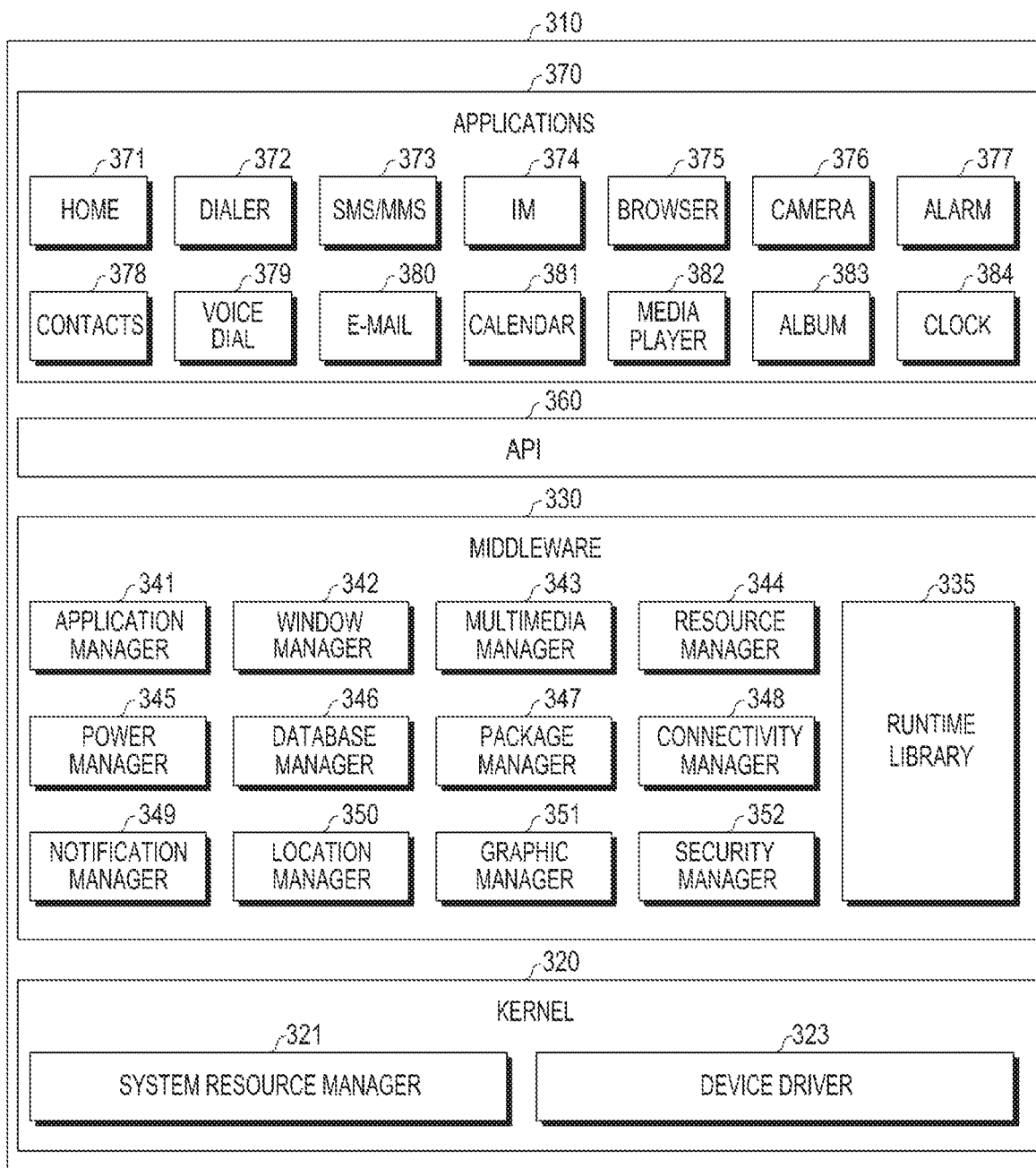
FIG. 3 is a block diagram illustrating an example program module according to various example embodiments.

FIG. 3 is a block diagram illustrating an example program module according to various example embodiments; According to an embodiment, the program module 310 (e.g. the program 140) may include an Operating System (OS)

that controls resources relating to an electronic device (e.g. the electronic device 101) and/or various applications (e.g. the application programs 147) that are executed in the operating system. The operating system may be, for example, Android, iOS, Windows, Symbian, Tizen, Bada, and the like The program module 310 may include a kernel 320, middleware 330, an Application Programming Interface (API) 360, and/or applications 370. At least a part of the program module 310 may be preloaded on the electronic device, or may be downloaded from an external electronic device (e.g. the electronic device 102 or 104 or the server 106).

The kernel 320 (e.g. the kernel 141) may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a WiFi driver, an audio driver, or an Inter-Process Communication (IPC) driver.

The middleware 330 may provide, for example, a function required by the applications 370 in common, or may provide various functions to the applications 370 through the API 360 so that the applications 370 can efficiently use limited system resources within the electronic device. According to an embodiment, the middleware 330 (e.g. the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, and the like.

The application manager 341 may manage, for example, the life cycle of at least one of the applications 370. The window manager 342 may manage Graphical User Interface (GUI) resources used on a screen. The multimedia manager 343 may determine formats required to reproduce various media files and may encode or decode a media file, using a coder/decoder (codec) appropriate for the corresponding format. The resource manager 344 may manage resources, such as the source code, the memory, the storage space, and the like of at least one of the applications 370.

The power manager 345 may operate together with, for example, a Basic Input/Output System (BIOS) to manage a battery or power and provide power information required for the operation of the electronic device. The database manager 346 may generate, search for, or change a database to be used by at least one of the applications 370. The package manager 347 may manage the installation or update of an application that is distributed in the form of a package file.

The connectivity manager 348 may manage a wireless connection, such as WiFi or Bluetooth. The notification manager 349 may display or notify of an event, such as an arrival message, an appointment, a proximity notification, etc., in such a manner as not to disturb a user. The location manager 350 may manage location information of the electronic device. The graphic manager 351 may manage a graphic effect to be provided to a user and a user interface relating to the graphic effect. The security manager 352 may provide various security functions required for system security, user authentication, etc. According to an embodiment, in a case where the electronic device (e.g. the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Further, the middleware 330 may dynamically remove some of the existing elements, or may add new elements.

The API 360 (e.g. the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 370 (e.g. the application programs 147) may include one or more applications that can perform functions, for example, home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (e.g. measuring exercise quantity or blood sugar), and environment information (e.g. atmospheric pressure, humidity, temperature information, and the like).

According to an embodiment, the applications 370 may include an application (hereinafter, referred to as an "information exchange application" for convenience of description) that supports information exchange between the electronic device (e.g. the electronic device 101) and an external electronic device (e.g. the electronic device 102 or 104). The information exchange application may include, for example, a notification relay application for transferring specific information to an external electronic device or a device management application for managing an external electronic device.

For example, the notification relay application may include a function of delivering, to the external electronic device (e.g. the electronic device 102 or 104), notification information generated by other applications (e.g. an SMS/MMS application, an e-mail application, a health care application, an environmental information application, and the like) of the electronic device. Further, the notification relay application may, for example, receive notification information from the external electronic device and may provide the received notification information to a user.

The device management application may manage (e.g. install, delete, or update), for example, at least one function of an external electronic device (e.g. the electronic device 102 or 104) that communicates with the electronic device (e.g. a function of turning on/off the external electronic device itself (or some components thereof) or a function of adjusting the brightness (or resolution) of a display), applications that operate in the external electronic device, or services (e.g. a call service, a message service, and the like) that are provided by the external electronic device.

According to an embodiment, the applications 370 may include applications (e.g. a health care application of a mobile medical appliance, and the like) that are specified according to attributes of an external electronic device (e.g. the electronic device 102 or 104). According to an embodiment, the applications 370 may include an application received from the external electronic device (e.g. the server 106, or the electronic device 102 or 104). According to an embodiment, the applications 370 may include preloaded applications or third-party applications that can be downloaded from a server. Names of the elements of the program module 310 according to the above-described embodiments may change depending on the type of OS.

According to various embodiments, at least some of the program module 310 may be implemented in software, firmware, hardware, or a combination of two or more thereof. At least some of the program module 310 may be implemented (e.g. executed) by, for example, the processor (e.g. the processor 210). At least some of the program module 310 may include, for example, a module, a program, a routine, a set of instructions, and/or a process for performing one or more functions.

Figure 4:
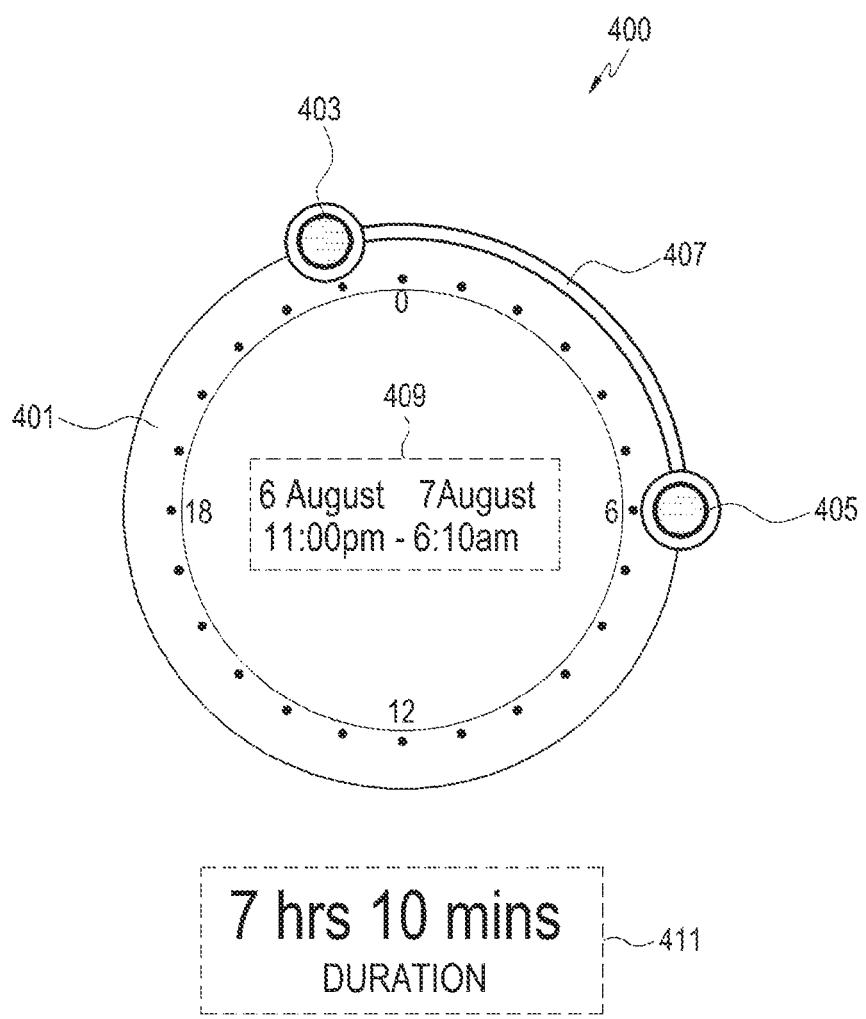
FIG. 4 is a diagram illustrating an example user interface according to various example embodiments.

FIG. 4 is a diagram illustrating an example user interface according to various example embodiments;

Referring to FIG. 4, the user interface 400 may include a plurality of preset time points 401, and a first icon 403 and a second icon 405, which may be positioned at a first point and a second point among the plurality of time points 401, respectively. For example, the first icon 403 may be an icon for a start time setting and the second icon 405 may be an icon for an end time setting.

The plurality of time points 401 may be arranged at regular intervals along a circumferential direction in an edge area of a circular dial and include a date change point. Further, the plurality of time points 401 may correspond to a 24-hour range. For example, the plurality of time points 401 may be time points obtained by dividing the edge area of the circular dial into 24 hours by a pre-designated time unit, such as a one-hour unit, a ten-minute unit, or a one-minute unit. Further, for example, visual effects (e.g. dot form and/or corresponding time), which are designated for time points corresponding to time units such as one o'clock, two o'clock, and three o'clock, may be displayed so that the plurality of time points 401 can be visually distinguished. Further, the date change point may be a point corresponding to a time of midnight.

Each of the first point and the second point may be a point corresponding to a date and time (initial date and initial time) preset according to a reference designated in an electronic device (e.g. electronic device 101). A setting of the initial date and initial time will be described in detail with reference to FIGS. 5A and 5B.

Further, the user interface 400 may display a date and time corresponding to a location of each of the first icon 403 and the second icon 405. For example, the electronic device (e.g. electronic device 101) may display, in a first area 409 of the user interface 400, a date and time corresponding to each of the first and second points at which the first icon 403 and the second icon 405 are positioned. For example, when the first point at which the first icon 403 is positioned is 11:00 p.m. among the plurality of time points 401 and a date corresponding to the first point at which the first icon 403 is positioned is August 6, the electronic device may display "6 August" and "11:00 pm" in the first area 409, as illustrated in FIG. 4. Further, for example, when the second point at which the second icon 405 is positioned is 6:10 a.m. among the plurality of time points 401 and a date corresponding to the second point at which the second icon 405 is positioned is August 7, the electronic device may display "7 August" and "6:10 am" in the first area 409, as illustrated in FIG. 4.

Further, the user interface 400 may display a duration from a date and time corresponding to a location of the first icon 403 to a date and time corresponding to a location of the second icon 405. For example, referring to FIG. 4, the electronic device may display, in a second area 411 of the user interface 400, 7 hrs 10 mins that is a duration from 11:00 p.m., August 6, which is a date and time corresponding to the first point at which the first icon 403 is positioned, to 6:10 a.m., August 7 which is a date and time corresponding to the second point at which the second icon 405 is positioned.

Further, the user interface 400 may display a line 407, which visually indicates the duration in a time elapse direction, on the plurality of time points 401. For example, the line 407 may be a line which makes a connection from the first icon 403 to the second icon 405 in the time elapse direction and the length of the line may be variable according to the location of the first icon 403 and of the second icon 405.

FIGS. 5A and 5B illustrate an example initial time and initial date setting of a first icon and a second icon of a user interface 500 according to various example embodiments.

The electronic device (e.g. electronic device 101) may determine an initial time corresponding to a first icon 503 (e.g. first icon 403) and an initial time corresponding to a second icon 505 (e.g. second icon 405) by using at least one among initial setting information preset in the electronic device, user setting information preset according to a user operation, log information of the electronic device, analysis information of a date and time setting pattern, and setting information received from the outside, which are the designated references.

According to the determining of the initial time, the electronic device may determine a first point at which the first icon 503 is positioned and a second point at which the second icon 505 is positioned.

The electronic device may determine an initial date corresponding to the first icon 503 (or an initial date corresponding to the second icon 505) by using at least one among initial setting information preset in the electronic device, user setting information preset according to a user operation, log information of the electronic device, and date and time setting pattern analysis information.

Referring to FIGS. 5A to 5F, when the electronic device presets the initial date corresponding to the first icon 503, the electronic device may automatically set the initial date corresponding to the second icon 505 according to the location of the first icon 503 and of the second icon 505. For example, when a date corresponding to the first icon 503 is determined, the electronic device may automatically determine a date corresponding to the second point, at which the second icon 505 is positioned, according to the location of the first icon 503 and of the second icon 505. Further, the user interface 500 may display a line 507, which visually indicates the duration in a time elapse direction, on the plurality of time points 501.

Further, when the electronic device presets the initial date corresponding to the second icon 505, the electronic device may automatically set the initial date of the first icon 503 according to the location of the first icon 503 and of the second icon 505. For example, when a date corresponding to the second icon 505 is determined, the electronic device may automatically determine a date corresponding to the first point, at which the first icon 503 is positioned, according to the location of the first icon 503 and of the second icon 505.

Hereinafter, an interval from a time point at midnight corresponding to a date change point to a time point before noon, among a plurality of time points 501 (e.g. the plurality of time points 401) of the user interface 500 (e.g. user interface 400), will be referred to as a first interval 530 and an interval from a time point at noon to a time point before midnight will be referred to as a second interval 540.

Referring to FIG. 5A, when the second point is a point of the first interval 530, the first point is a point of an interval before the second point within the first interval 530, and the time of the second point precedes the time of the first point, dates corresponding to a location of the first icon 503 and a location of the second icon 505 may be determined to be the same date. For example, when the initial date of the first icon 503 is determined to be August 7 and when the first icon 503 is positioned at a point of 2:00 a.m. and the second icon 505 is positioned at a point of 6:10 a.m., as in FIG. 5A, a date corresponding to the location of the second icon 505 may be determined to be August 7. Alternatively, when the initial date of the second icon 505 is determined to be August 7 and when the first icon 503 is positioned at a point of 2:00 a.m. and the second icon 505 is positioned at a point of 6:10 a.m., as in FIG. 5A, a date corresponding to the location of the first icon 503 may be determined to be August 7.

Referring to FIG. 5B, when the second point is a point of the first interval 530, the first point is a point of an interval after the second point within the first interval 530, and the time of the first point precedes the time of the second point, a date corresponding to a location of the first icon 503 may be one day earlier than a date corresponding to a location of the second icon 505. For example, when the initial date of the second icon 505 is determined to be August 7 and when the first icon 503 is positioned at a point of 11:00 a.m. and the second icon 505 is positioned at a point of 2:00 a.m., as in FIG. 5B, a date corresponding to a location of the first icon 503 may be determined to be August 6. Alternatively, when the initial date of the first icon 503 is determined to be August 6 and when the first icon 503 is positioned at a point of 11:00 a.m. and the second icon 505 is positioned at a point of 2:00 a.m., as in FIG. 5B, a date corresponding to the location of the second icon 505 may be determined to be August 7.

Referring to FIG. 5C, when the second point is a point of the first interval 530 and the first point is a point of an interval of the second interval 540, a date corresponding to a location of the first icon 503 may be one day earlier than a date corresponding to a location of the second icon 505. For example, when the initial date of the second icon 505 is determined to be August 7 and when the first icon 503 is positioned at a point of 11:00 p.m. and the second icon 505 is positioned at a point of 6:10 a.m., as in FIG. 5C, a date corresponding to a location of the first icon 503 may be determined to be August 6. Alternatively, when the initial date of the first icon 503 is determined to be August 6 and when the first icon 503 is positioned at a point of 11:00 p.m. and the second icon 505 is positioned at a point of 6:10 a.m., a date corresponding to a location of the second icon 505 may be determined to be August 7.

Referring to FIG. 5D, when the second point is a point of the second interval 540 and the first point is a point of the first interval 530, a date corresponding to a location of the first icon 503 and a date corresponding to a location of the second icon 505 may be identical. For example, when the initial date of the first icon 503 is determined to be August 7 and when the first icon 503 is positioned at a point of 6:10 a.m. and the second icon 505 is positioned at a point of 10:00 p.m., as in FIG. 5D, the date corresponding to the location of the second icon 505 may be August 7. Alternatively, when the initial date of the second icon 50 is determined to be August 7 and when the first icon 503 is positioned at a point of 6:10 a.m. and the second icon 50 is positioned at a point of 10:00 p.m., as in FIG. 5D, the initial date of the first icon 503 may be determined to be August 7.

Referring to FIG. 5E, when the second point is a point of the second interval 540 and the first point is a point of a time interval before the second point within the second interval 540, a date corresponding to a location of the first icon 503 and a date corresponding to a location of the second icon 50 may be identical. For example, when the initial date of the second icon 50 is determined to be August 7 and when the first icon 503 is positioned at a point of 6:00 p.m. and the second icon 50 is positioned at a point of 11:00 p.m., as in FIG. 5E, a date corresponding to a location of the first icon 503 may be determined to be August 7. Alternatively, when the initial date of the first icon 503 is determined to be August 7 and when the first icon 503 is positioned at a point of 6:00 p.m. and the second icon 50 is positioned at a point of 10:00 p.m., as in FIG. 5E, a date corresponding to a location of the second icon 50 may be determined to be August 7.

Referring to FIG. 5F, when the second point is a point of the second interval 540 and the first point is a point of a time interval after the second point within the second interval 540, a date corresponding to a location of the first icon 503 may be one day earlier than a date corresponding to a location of the second icon 505. For example, when the initial date of the second icon 50 is determined to be August 7 and when the first icon 503 is positioned at a point of 10:00 p.m. and the second icon 50 is positioned at a point of 6:00 p.m., as in FIG. 5F, a date corresponding to a location of the first icon 503 may be determined to be August 6. Alternatively, when the initial date of the first icon 503 is determined to be August 6 and when the first icon 503 is positioned at a point of 10:00 p.m. and the second icon 50 is positioned at a point of 6:00 p.m., as in FIG. 5F, a date corresponding to a location of the second icon 505 may be determined to be August 7.

Figure 6:
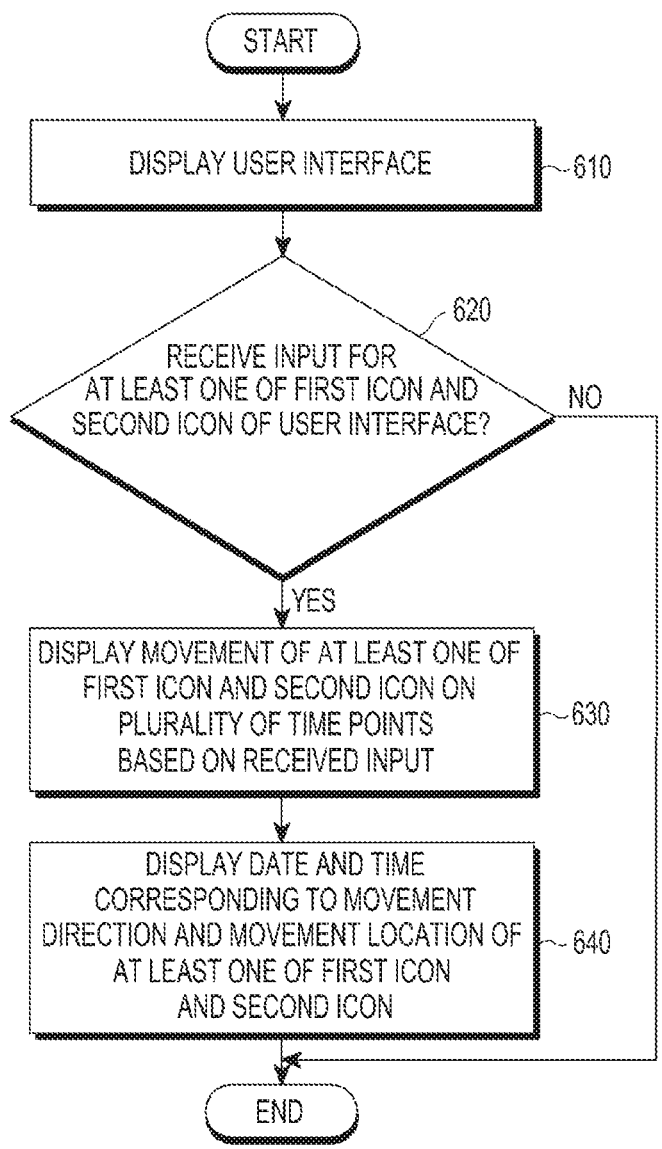
FIG. 6 is a flowchart illustrating example date and time setting by an electronic device according to various example embodiments.

FIG. 6 is a flowchart illustrating an example date and time setting by an electronic device (e.g. electronic device 101) according to various example embodiments.

In operation 610, the electronic device may display a user interface (e.g. user interface 400). The user interface may have, for example, an analog watch form. Further, the user interface may include: a plurality of time points (e.g. the plurality of time points 401) which are arranged at regular intervals along a circumferential direction in an edge area of a circular dial and includes a date change point; a first icon (e.g. first icon 403) positioned at a first point among the plurality of time points; and a second icon (e.g. second icon 405) positioned at a second point among the plurality of time points.

The first point and the second point may be determined according to the determination of a date and time corresponding to the first icon and a date and time corresponding to the second icon.

Further, the date and time corresponding to the first icon and the date and time corresponding to the second icon may be determined by using at least one among initial setting information preset in the electronic device, user setting information preset according to a user operation, log information of the electronic device, and date and time setting pattern analysis information.

In operation 620, the electronic device may determine whether an input for at least one of the first icon and the second icon of the user interface is received. When the electronic device determines in operation 620 that the input for the at least one of the first icon and the second icon of the user interface has been received, the electronic device may execute operation 630. Otherwise, the electronic device may end an operation of the present embodiment.

In operation 630, the electronic device may display, according to the received input, the at least one of the first icon and the second icon to be moved on the plurality of time points of the user interface.

The input may be, for example, a gesture that moves, after touching at least one the first icon and the second icon by using a user finger or a touch tool, the finger or the touch tool to another point among the plurality of time points while maintaining the touching.

For example, when a user touches the first icon by his/her finger or a touch tool and move his/her finger or the touch tool in a particular direction along the plurality of time points (e.g. the plurality of time points 501) while maintaining the touching of the first icon, the electronic device may display the first icon so that the first icon is moved in the particular direction along the plurality of time points in response to the movement of the finger.

The moving of the finger or the touch tool along the plurality of time points may include, for example, moving the finger or the touch tool on the plurality of time points.

Further, the moving of the finger or the touch tool along the plurality of time points may further include moving the finger or the touch tool along some areas of an outer part of the plurality of time points (or an outer part of a circular dial) by the user. At this time, the electronic device may display the at least one of the first icon and the second icon to be moved along the plurality of time points in consideration of at least one of the movement direction of, the movement distance of, and the movement area of the finger or the touch tool.

Further, the moving of the finger or the touch tool along the plurality of time points may further include moving the finger or the touch tool along some areas of an inner part of the plurality of time points by the user. At this time, the electronic device may display at least one of the first icon and the second icon to be moved along the plurality of time points in consideration of at least one of the movement direction of, the movement distance of, and the movement area of the finger or the touch tool.

In operation 640, the electronic device may display a date and time corresponding to the movement direction and movement location of the at least one of the first icon and the second icon.

For example, the date and time, which has been displayed in the user interface, corresponding to at least one of a location of the first icon and a location of the second icon, may be changed on the basis of the movement direction and movement location of the at least one of the first icon and the second icon.

For example, the changing of the time, which has been displayed in the user interface, corresponding to the at least one of the location of the first icon and the location of the second icon, may be changing a time, displayed to correspond to a location of at least one of the first icon and the second icon, so that the time corresponds to the movement location of the at least one of the first icon and the second icon.

Further, the changing of the date, which has been displayed in the user interface, corresponding to the at least one of the location of the first icon and the location of the second icon, may be changing, when at least one of the first icon and the second icon is displayed to be moved in a first direction via the date change point, a date displayed to correspond to a location of the at least one of the first icon and the second icon to a date obtained by adding one day to the date displayed to correspond to the location of the at least one of the first icon and the second icon.

Further, the changing of the date, which has been displayed in the user interface, corresponding to the at least one of the location of the first icon and the location of the second icon, may be changing, when at least one of the first icon and the second icon is displayed to be moved in a second direction opposite to the first direction via the date change point, a date displayed to correspond to a location of the at least one of the first icon and the second icon to a date obtained by subtracting one day from the date displayed to correspond to the location of the at least one of the first icon and the second icon.

Meanwhile, when the date and time corresponding to the first icon for determining a first point and a second point is determined by using the setting information received from the outside, the movement of the first icon and the second icon may be allowed to be performed only within the range from the first point to the second point. For example, the movement of the first icon and the second icon may not be allowed to deviate from the range from the first point to the second point. For example, the setting information received from the outside includes 11:00 p.m. as a time corresponding to the first icon and includes 9:00 a.m. as a time corresponding to the second icon, and therefore a first point of the first icon may be set to 11:00 p.m. and a second point of the second icon may be set to 9:00 a.m. At the time of the above-described setting, the movement of the first icon and the second icon may be allowed to be performed only between time points from 11:00 p.m. to 9:00 a.m.

FIG. 7A to FIG. 7D are diagrams illustrating example date and time setting by an electronic device (e.g. electronic device 101) according to various example embodiments.

Referring to FIG. 7A to FIG. 7D, the user interface 700 (e.g. user interface 400) may include: a plurality of time points 701 (e.g. the plurality of time points 401) including a date change point; a first icon 703 (e.g. first icon 403) positioned at a first point among the plurality of time points 701; a second icon 705 (e.g. second icon 405) positioned at a second point among the plurality of time points 701; and a line 707 (e.g. line 407) that makes a connection from the first icon 703 to the second icon 705 in a time elapse direction on the plurality of time points 701. The date change point may be a midnight time point. The plurality of time points may correspond to a 24-hour range.

Further, as in FIG. 7A to FIG. 7D, the first icon 703 may be an icon for a start time setting, which has a preset shape and can be used to input a sleeping time, as in FIG. 7A to FIG. 7D. As in FIG. 7A to FIG. 7D, the second icon 705 may be an icon for an end time setting, which has a preset shape and can be used to input a sleeping time.

Figure 7D:
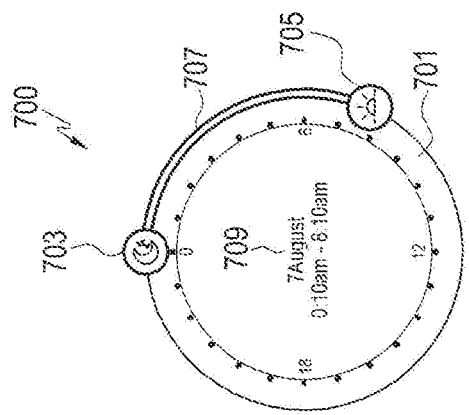
FIGS. 7A, 7B, 7C and 7D are diagrams illustrating example date and time setting by an electronic device according to various example embodiments.
Figure 7C:
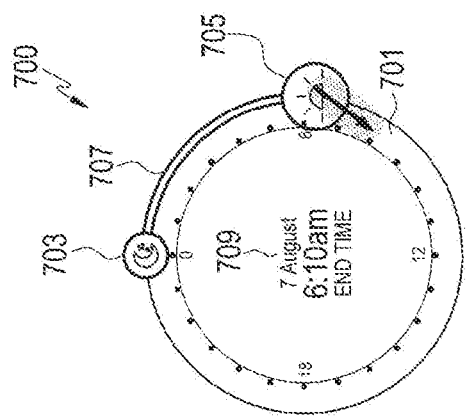
Figure 7B:
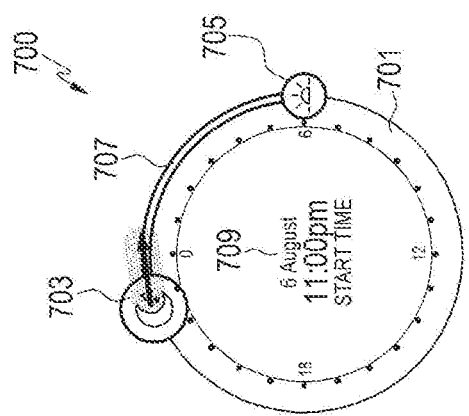
Figure 7A:
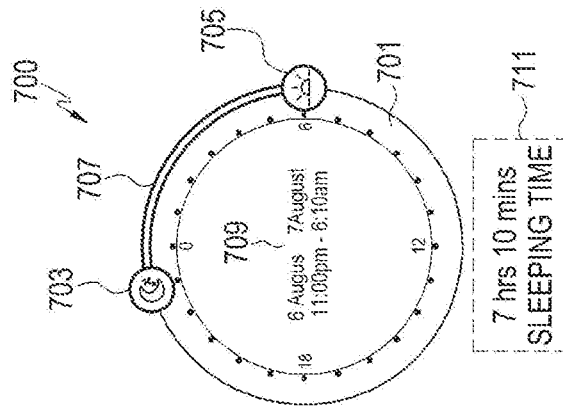

Referring to FIG. 7A, on the basis of a designated reference, the electronic device may position the first icon 703 at a point of 11:00 p.m. among the plurality of time points 701 and may position the second icon 705 at a point of 6:10 a.m. among the plurality of time points 701. Further, the electronic device may display, in a first area 709, "6 August" and "11:00 p.m.", which are a date and a time corresponding to a location of the first icon 703, and "7 August" and "6:10 a.m.", which are a date and a time corresponding to a location of the second icon 705. Further, the electronic device may display, in a second area 711, 7 hrs 10 mins which is a sleeping time (e.g. duration) from the date and time corresponding to the location of the first icon 703 to the date and time corresponding to the location of the second icon 704.

When a user touches, by a finger, the first icon 703 of the user interface 700 displayed as in FIG. 7A, the electronic device may enlarge the size of the first icon 703 to a preset size as in FIG. 7B. Further, as in FIG. 7B, the electronic device may display, in the first area 709, only "6 August" and "11:00 p.m.", which are the date and time corresponding to the first icon 703. Further, the electronic device may additionally display, in the first area 709, "start time" which is a visual effect corresponding to the first icon 703.

When the user moves the finger to any one point along the plurality of time points 701 while maintaining the touching and then releases the finger, the electronic device may move the first icon 703 to the point, for example, a point of 00:10 a.m., as illustrated in FIG. 7C. Then, when the user touches the second icon 705 by a finger, the electronic device may enlarge the size of the second icon 705 to a predetermined size as in FIG. 7C. When the second icon 705 is touched, the electronic device may display, in the first area 709, only "7 August" and "6:10 a.m.", which are the date and time corresponding to the second icon 705, as in FIG. 7C. Further, the electronic device may additionally display, in the first area 709, "end time" which is a visual effect corresponding to the second icon 705. When the user moves the finger to any one point along the plurality of time points 701 while maintaining the touching and then releases the finger, the electronic device may move the second icon 705 to the point, for example, a point of 8:10 p.m., as illustrated in FIG. 7D. Further, the electronic device may display, in the first area 709, "7 August" which is a date corresponding to the location of the moved first icon 703 and of the moved second icon 705, "0:10 a.m." which is a time corresponding to the location of the first icon 703, and "8:10 a.m." which is a time corresponding to the location of the second icon 705.

Meanwhile, according to various embodiments, when the user touches the first icon 703 of the user interface 700 displayed as in FIG. 7A, the electronic device may display not only "6 August" and "11:00 p.m.", which are the date and time corresponding to the first icon 703, but also "7 August" and "6:10 a.m." which are the date and time corresponding to the second icon 705, unlike FIG. 7B.

Further, according to various embodiments, when the second icon 705 is touched, the electronic device may display, in the first area 709, "6:10 a.m." which is a time corresponding to the second icon 705, "0:10 a.m." which is a time corresponding to the first icon 703, and "7 August" which is a date corresponding to the first icon 703 and the second icon 705, Unlike FIG. 7 (c).

Further, according to various embodiments, in a state in which the electronic device has displayed, as in FIG. 7D, "7 August" which is a date corresponding to the location of the first icon 703 and of the second icon 705, "0:10 a.m." which is a time corresponding to the location of the first icon 703, and "8:10 a.m." which is a time corresponding to the location of the second icon 705, when the electronic device moves the first icon 703 in a direction opposite to a time elapse direction along the plurality of time points 701 past a midnight time to position the first icon 703 at a point of 11:00 p.m. and moves the second icon 705 in a direction opposite to a time elapse direction along the plurality of time points 701 to position the second icon 705 at a point of 6:10 a.m., the user interface 700 may be allowed to be displayed as in FIG. 7A. As in FIG. 7A, the electronic device may display, in a first area 709, "6 August" and "11:00 p.m.", which are a date and a time corresponding to the location of the first icon 703, and "7 August" and "6:10 a.m." which are a date and a time corresponding to the location of the second icon 705.

FIGS. 8A to 8G are diagrams illustrating example date and time setting by an electronic device (e.g. electronic device 101) according to various example embodiments.

Referring to FIGS. 8A to 8G a user interface 800 (e.g. user interface 400) may include: a plurality of time points 801 (e.g. the plurality of time points 401) including a date change point; a first icon 803 (e.g. first icon 403) positioned at a first point among the plurality of time points 801; a second icon 805 (e.g. second icon 405) positioned at a second point among the plurality of time points 801; and a line 807 (e.g. line 407) that makes a connection from the first icon 803 to the second icon 805 in a time elapse direction on the plurality of time points 801. The date change point may be a midnight time point. The plurality of time points may correspond to a 24-hour range. Further, the electronic device may display, in a second area 811, which may, for example, indicate a duration from the date and time corresponding to the location of the first icon 803 to the date and time corresponding to the location of the second icon 805.

When a user touches the first icon 803 of the user interface 800 displayed as in FIG. 8A and then moves in a first direction, the electronic device may display, in a first area 809 (e.g. first area 409), "6 August" and "11:00 p.m.", which are a date and time corresponding to a movement location (a current location according to the movement) of the first icon 803, as in FIG. 8A. Further, the electronic device may additionally display, in the first area 809, "start time" which is a visual effect corresponding to the first icon 803.

Further, when the user continues to move the first icon 803 in the first direction, an interval between a location point of the first icon 803 and a location point of the second icon 805 may become a preset reference interval. Even after the interval between the location point of the first icon 803 and the location point of the second icon 805 has become the preset reference interval, when the user continues to move the first icon 803 in the first direction, the first icon 803 and the second icon 805 may move in the first direction while maintaining the reference interval. Referring to FIG. 8B, for example, when the reference interval is 10 minutes and when the first icon 803 is positioned at a point of 7:50 a.m., the second icon 805 may be positioned at a point of 8:00 a.m.

As in FIG. 8C, when the first icon 803 is positioned at a point of 9:00 p.m. and the second icon 805 is positioned at a point of 8:50 p.m., the electronic device may display, in the first area 809 of the user interface 800, "6 August" and "9:00 p.m." which are a date and time of the first icon 803 and "7 August" and "8:50 p.m." which are a date and time corresponding to the second icon 805. When the user touches the second icon 805 by using a finger or a touch tool and then moves the finger or the touch tool in a first direction along the plurality of time points 801 while maintaining the touching, the first icon 803 and the second icon 805 may be positioned at a point of 2:00 a.m. and at a point of 1:50 a.m., respectively, while maintaining 23 hours 50 minutes which is an existing sleeping time, as in FIG. 8D. Further, the electronic device may display, in the first area 809, "7 August" which is a date of the first icon 803 and "8 August" which is a date of the second icon 805. Also, the electronic device may display, in the first area 809, "2:00 a.m." which is a time corresponding to the first icon 803 and "1:50 a.m." which is a time corresponding to the second icon 805.

Figure 8G:
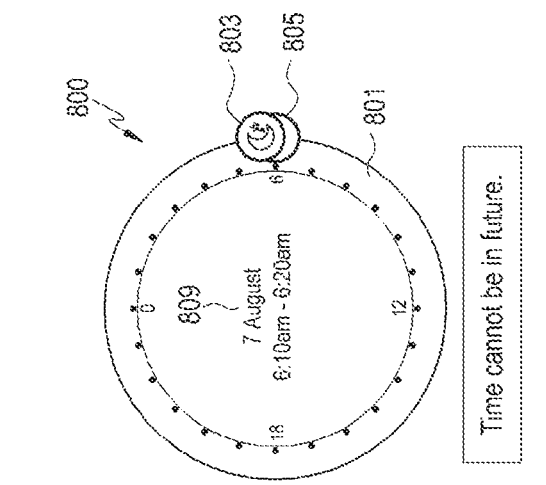
Figure 8F:
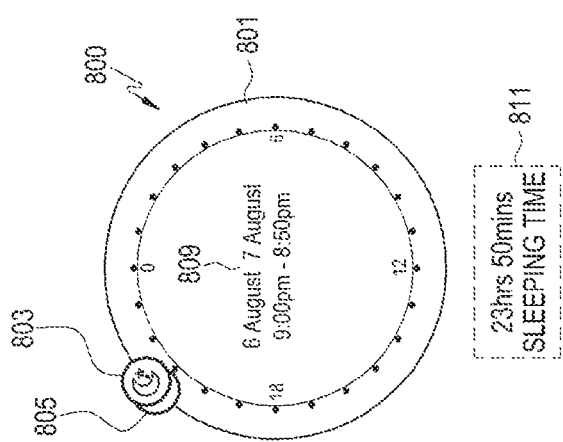
Figure 8E:
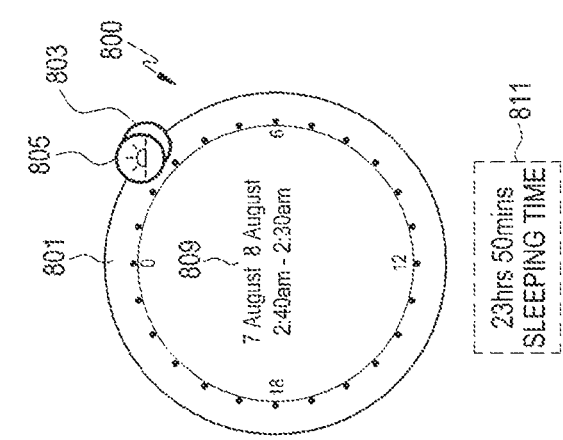

As in FIG. 8E, when the first icon 803 is positioned at a point of 2:40 a.m. and the second icon 805 is positioned at a point of 2:30 a.m., the electronic device may display, in the first area 809 of the user interface 800, "7 August" and "2:40 a.m." which are a date and time of the first icon 803 and "8 August" and "2:30 a.m." which are a date and time corresponding to the second icon 805. When the user touches the second icon 805 by using a finger or a touch tool and then moves the finger or the touch tool in a second direction along the plurality of time points 801 while maintaining the touching, the first icon 803 and the second icon 805 may be positioned at a point of 9:00 p.m. and at a point of 8:50 p.m., respectively, while maintaining 23 hours 50 minutes which is an existing sleeping time, as in FIG. 8F. Further, the electronic device may display, in the first area 809, "6 August" which is a date of the first icon 803 and "7 August" which is a date of the second icon 805. Also, the electronic device may display, in the first area 809, "9:00 p.m." which is a time corresponding to the first icon 803 and "8:50 p.m." which is a time corresponding to the second icon 805.

Meanwhile, referring to FIG. 8G even after the interval between the location point of the first icon 803 and the location point of the second icon 805 has become the preset reference interval, when the user continues to move the first icon 803 in the first direction, the electronic device may stop the movement of the first icon 803. Referring to FIG. 8G for example, in order to move the first icon 803 to a point of 6:20 a.m. via 6:10 a.m. when the reference interval is 6 minutes and the second icon 805 is positioned at a point of 6:20 a.m., the electronic device may position the first icon 803 at a point of 6:10 a.m. and display a warning phrase (e.g. time cannot be in future.) in a pop-up form.

Figures 9A, 9B:
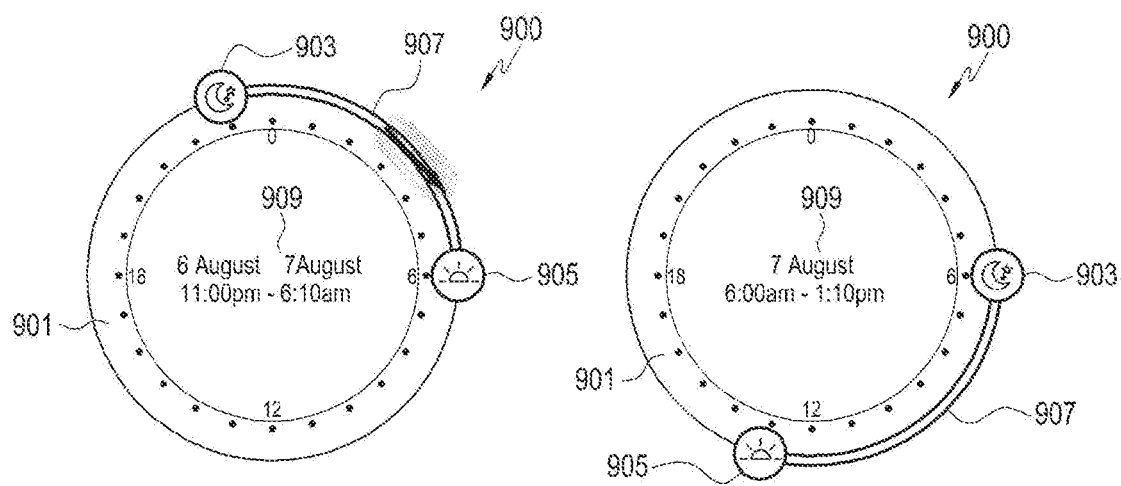
FIGS. 9A and 9B are diagrams illustrating example date and time setting by an electronic device according to various example embodiments.

FIGS. 9A and 9B are diagrams illustrating example date and time setting by an electronic device (e.g. electronic device 101) according to various example embodiments.

Referring to FIGS. 9A and 9B, a user interface 900 (e.g. user interface 400) may include: a plurality of time points 901 (e.g. the plurality of time points 401) including a date change point; a first icon 903 (e.g. first icon 403) positioned at a first point among the plurality of time points 901; a second icon 905 (e.g. second icon 405) positioned at a second point among the plurality of time points 901; and a line 907 (e.g. line 407) that makes a connection from the first icon 903 to the second icon 905 in a time elapse direction on the plurality of time points 901. The date change point may be a midnight time point. The plurality of time points may correspond to a 24-hour range.

As in FIG. 9A, when the first icon 903 is positioned at a point of 11:00 p.m. and the second icon 905 is positioned at a point of 6:10 a.m., the electronic device may display, in a first area 909 of the user interface 900, "6 August" and "11:00 p.m." which are a date and time of the first icon 903 and "7 August" and "6:10 a.m." which are a date and time corresponding to the second icon 905. When a user touches the line 907 by using a finger or a touch tool and then moves the finger or the touch tool in a first direction along the plurality of time points 901 while maintaining the touching, the first icon 903 and the second icon 905 may be positioned at a point of 6:00 a.m. and at a point of 1:10 p.m., respectively, while maintaining 7 hours 10 minutes which is an existing sleeping time, as in FIG. 9B. Further, the electronic device may display, in the first area 909, "7 August" which is a date of the first icon 903 and of the second icon 905. Also, the electronic device may display, in the first area 909, "6:00 a.m." which is a time corresponding to the first icon 903 and "1:10 p.m." which is a time corresponding to the second icon 905.

In addition, according to various embodiments, on the basis of a central part (or a first area (e.g. first area 409)) of a circular dial of a user interface (e.g. user interface 400), the user may tap any one point of the upper or lower end area of the central part in the circular dial (a gesture of shortly and lightly tapping a screen by one finger or a touch tool), thereby setting a detailed time of a time corresponding to first icon (e.g. first icon 403) or a time corresponding to a second icon (e.g. second icon 405).

For example, when the user taps any one point of the upper end area, the electronic device may increase the time corresponding to the first icon or the time corresponding to the second icon by a designated time unit (e.g. one minute, one second). Further, when the user taps any one point of the lower end area, the electronic device may decrease the time corresponding to the first icon or the time corresponding to the second icon by a designated time unit.

For example, when the plurality of time points is divided by a 10-minute unit, the minimum unit of time input in the first area is 10 minutes and therefore, it is impossible to perform an input for a one-minute unit. However, for example, when a time unit designated for setting a detailed time is set as one minute, the electronic device may increase or decrease the time corresponding to the first icon or the time corresponding to the second icon by single minutes according to an input of the above-described tap gesture in a state where the time corresponding to the first icon or the time corresponding to the second icon has been selected (or the first icon or the second icon has been selected).

For example, when the time corresponding to the first icon is 10:00 p.m. and the user taps the upper end area of the central part of the circular dial three times in a state in which the time corresponding to the first icon has been selected (or the first icon has been selected), the electronic device may change the time displayed in the first area to 10:03 p.m. and display the changed time. Further, for example, when the time corresponding to the first icon is 10:00 p.m. and the user taps the lower end area of the central part of the circular dial two times in a state in which the time corresponding to the first icon has been selected (or the first icon has been selected), the electronic device may change the time displayed in the first area to 9:58 p.m. and display the changed time.

For example, when the user taps the first area (e.g. first area 409), the electronic device may display a screen preset for a detailed time setting therein to enable the detailed time setting according to a user input.

Further, in the above various example embodiments, it has been described that a user interface can be used to input a sleeping time. However, according to various example embodiments, the user interface can be variously used for a schedule input, a do-not-disturb time period (time) setting, etc in addition to the inputting of the sleeping time.

Further, the above embodiments have been described assuming that, when dates corresponding to a location of the first icon and a location of the second icon are displayed and when the dates corresponding to the location of the first icon and the location of the second icon are identical, only one date is displayed in a designated area of the user interface. However, according to various example embodiments, even when the dates corresponding to the locations of the first icon and the second icon are identical, the date corresponding to the first icon and the date corresponding to the second icon may be displayed in the designated area of the user interface, respectively. For example, even when the dates corresponding to the location of the first icon and of the second icon are identical, the electronic device may display two identical dates corresponding to the first icon and the second icon in a first area.

According to various embodiments, a method for setting a date and time by an electronic device includes: displaying a user interface that includes a plurality of time points arranged at regular intervals along a circumferential direction in an edge area of a substantially circular dial and including a date change point, a first icon positioned at a first point among the plurality of time points, and a second icon positioned at a second point among the plurality of time points; receiving an input for at least one of the first icon and the second icon; displaying movement of the at least one of the first icon and the second icon on the plurality of time points according to the received input; and displaying a date and time corresponding to a movement direction and movement location of the at least one of the first icon and the second icon.

According to various embodiments, the user interface displays a date and time corresponding to a location of the first icon and a date and time corresponding to a location of the second icon, and the date and time, which has been displayed in the user interface, corresponding to at least one of the location of the first icon and the location of the second icon, may be changed on the basis of a movement direction and movement location of at least one of the first icon and the second icon.

According to various embodiments, the changing of the date and time, which has been displayed in the user interface, corresponding to the at least one of the location of the first icon and the location of the second icon may include: changing the time, which has been displayed to correspond to a location of the at least one of the first icon and the second icon, so that the time corresponds to a movement location of the at least one of the first icon and the second icon; and changing, when movement of the at least one of the first icon and the second icon in a first direction via the date change point is displayed, the date displayed to correspond to the location of the at least one of the first icon and the second icon to a date obtained by adding one day to the date displayed to correspond to the location of the at least one of the first icon and the second icon.

According to various embodiments, the changing of the date and time, which has been displayed in the user interface, corresponding to the at least one of the location of the first icon and the location of the second icon may include changing, when movement of the at least one of the first icon and the second icon in a second direction opposite to the first direction via the date change point is displayed, the date displayed to correspond to the location of the at least one of the first icon and the second icon to a date obtained by subtracting one day from the date displayed to correspond to the location of the at least one of the first icon and the second icon.

According to various embodiments, when displaying dates corresponding to a location of the first icon and a location of the second icon, if the dates corresponding to the location of the first icon and the location of the second icon are identical, only one date may be displayed in a designated area of the user interface.

According to various embodiments, the plurality of time points may correspond to a 24-hour range.

According to various embodiments, the method may further include displaying a duration from the date and time corresponding to the location of the first icon to the date and time corresponding to the location of the second icon.

According to various embodiments, the displaying of the movement of the at least one of the first icon and the second icon on the plurality of time points according to the received input may include: stopping the movement of the first icon when movement of the first icon in a first direction on the plurality of time points is displayed and when an interval between a location point of the first icon and a location point of second icon becomes a preset reference interval; and stopping the movement of the second icon when movement of the second icon in a second direction on the plurality of time points is displayed and when the interval between the location point of the first icon and the location point of second icon becomes the preset reference interval.

According to various embodiments, the displaying of the movement of the at least one of the first icon and the second icon on the plurality of time points according to the received input may further include displaying a user interface indicating that the first icon and the second icon cannot cross each other, when the movement of the first icon is stopped and then an input for moving the first icon in the first direction is received or when the movement of the second icon is stopped and then an input for moving the second icon in the second direction is received.

According to various embodiments, the displaying of the movement of the at least one of the first icon and the second icon on the plurality of time points according to the received input may further include: when movement of the first icon in a first direction on the plurality of time points is displayed and when an interval between a location point of the first icon and a location point of second icon becomes a preset reference interval, displaying simultaneous movement of the first icon and the second icon in the first direction while maintaining the reference interval; and, when movement of the second icon in a second direction on the plurality of time points is displayed and when the interval between the location point of the first icon and the location point of second icon becomes the preset reference interval, displaying simultaneous movement of the first icon and the second icon in the second direction while maintaining the reference interval.

According to various embodiment, the method may further include: displaying a line that makes a connection from the first icon to the second icon, in a time elapse direction on the plurality of time points; and displaying movement of the line according to an input reception for the line and simultaneously displaying an accompanying movement of the first icon and the second icon.

According to various embodiments, when the second point is a point of a first interval, which is an interval from a time point at midnight corresponding to the date change point to a time point before noon, among the plurality of time points, and the first point is a point of an interval before the second point within the first interval, a date corresponding to a location of the first icon and a date corresponding to a location of the second icon may be identical.

According to various embodiments, when the second point is a point of the first interval among the plurality of time points and the first point is a point of an interval after the second point within the first interval, the date corresponding to the location of the first icon may be one day earlier than the date corresponding to the location of the second icon.

According to various embodiments, when the second point is a point of the first interval and the first point is a point of a second interval, which is an interval from a time point at noon to a time point before midnight, the date corresponding to the location of the first icon may be one day earlier than the date corresponding to the location of the second icon.

According to various embodiments, when the second point is a point of the second interval and the first point is a point of the first interval, the date corresponding to the location of the first icon and the date corresponding to the location of the second icon may be identical.

According to various embodiments, when the second point is a point of the second interval and the first point is a point of an interval before the second point at the second interval, the date corresponding to a location of the first icon and the date corresponding to a location of the second icon may be identical.

According to various embodiments, when the second point is a point of the second interval and the first point is a point of an interval after the second point within the second interval, the date corresponding to the location of the first icon may be one day earlier than the date corresponding to the location of the second icon.

According to various embodiments, the method may further include determining a date and time corresponding to the first icon and a date and time corresponding to the second icon by using at least one among initial setting information preset in the electronic device, user setting information preset according to a user operation, log information of the electronic device, date and time setting pattern analysis information, and setting information received from the outside, wherein the first point and the second point may be determined according to the determining of the date and time corresponding to the first icon and the date and time corresponding to the second icon.

According to various embodiments, the input may be a gesture that moves, after touching at least one the first icon and the second icon by using a user finger or a touch tool, the finger or the touch tool to another point among the plurality of time points while maintaining the touching.

The term "module" as used herein may, for example, refer to a unit including one of hardware (e.g., circuitry), software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of processing circuitry, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (e.g. modules or functions thereof) or the method (e.g. operations) according to the present disclosure may be implemented by a command stored in a computer-readable storage medium in a programming module form. The instruction, when executed by a processor (e.g. the processor 120), may cause the one or more processors to execute the function corresponding to the instruction. The computer-readable storage medium may be, for example, the memory 130.

The computer readable recoding medium may include a hard disk, a floppy disk, magnetic media (e.g. a magnetic tape), optical media (e.g. a Compact Disc Read Only Memory (CD-ROM) and a Digital Versatile Disc (DVD)), magneto-optical media (e.g. a floptical disk), a hardware device (e.g. a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided simply for ease of description of the present disclosure and to aid in understanding of the present disclosure, and are not intended to limit the scope of the present disclosure. Therefore, it should be understood that all modifications and changes or modified and changed forms based on the technical idea of the present disclosure fall within the scope of the present disclosure.

What is claimed is:

1. A multifunction electronic device comprising:
   a touch-sensitive display;
   a memory configured to store executable instructions for inputting, using the touch-sensitive display, time period information; and
   one or more processors configured to execute the instructions stored in the memory to enable inputting of the time period information by operations comprising:
   displaying, on the touch-sensitive display, visual display elements comprising time points and an indicator representing a duration of a time period, the indicator comprising a first icon at one end region of the indicator corresponding to a start time of the time period and a second icon at the other end region of the indicator corresponding to an end time of the time period;
   displaying, concurrently with the visual display elements, a numerical value for the start time, a numerical value for the end time and a numerical value for the duration;
   based on a first touch input to the first icon for moving the first icon to a first time point, adjusting the start time and duration of the time period, and displaying a numerical value for the start time adjusted by moving the first icon and a numerical value for the duration adjusted by moving the first icon;
   based on a second touch input to the second icon for moving the second icon to a second time point, adjusting the end time and duration of the time period, and displaying a numerical value for the end time adjusted by moving the second icon and a numerical value for the duration adjusted by moving the second icon;
   based on a third touch input on a line connected between the first icon and the second icon in a clockwise direction, simultaneously rotating the first icon, the line and the second icon in the clockwise direction while maintaining a same duration of the time period; and
   based on a fourth touch input on the line connected between the first icon and the second icon in a counterclockwise direction, simultaneously rotating the first icon, the line and the second icon in the counterclockwise direction while maintaining the same duration of the time period,
   wherein a first image within the first icon is different from a second image within the second icon.

2. The electronic device of claim 1, wherein the time points are arranged along a circumferential direction of a substantially circular dial, the first icon is movable along the circular dial for setting a sleep start time based on the first touch input, and the second icon is movable along the circular dial for setting a sleep end time based on the second touch input.

3. The electronic device of claim 2, wherein the sleep start time is settable to a date that is different from a date of the sleep end time by moving one or both of the first icon and the second icon along the circular dial.

4. The electronic device of claim 1, wherein the time period is settable within a 24-hour time range.

5. The electronic device of claim 1, wherein the time period corresponds to a sleep time period.

6. The electronic device of claim 1, wherein the first icon is for setting a sleep start time, and has a preset appearance.

7. The electronic device of claim 1, wherein the second icon is for setting a sleep end time, and has a preset appearance.

8. An electronic device comprising:
a touch-sensitive display;
a memory configured to store executable instructions; and
a processor configured to execute the instructions stored in the memory to:
display, on the touch-sensitive display, a user interface including a plurality of time points arranged along a circumferential direction of a substantially circular dial, a visual indicator representing a duration of a time period, a first icon at one end region of the visual indicator corresponding to a start time of the time period and a second icon at the other end region of the visual indicator corresponding to an end time of the time period,
based on a first touch input to the first icon for moving the first icon to a first time point along the circular dial, adjust the start time and a duration of the time period according to the adjusted start time, wherein a length of the visual indicator changes according to the adjusted duration,
based on a second touch input to the second icon for moving the second icon to a second time point along the circular dial, adjust the end time and a duration of the time period according to the adjusted end time, wherein a length of the visual indicator changes according to the adjusted duration,
based on a third touch input on a line connected between the first icon and the second icon in a clockwise direction, simultaneously rotate the first icon, the line and the second icon in the clockwise direction while maintaining a same duration of the time period, and
based on a fourth touch input on the line connected between the first icon and the second icon in a counterclockwise direction, simultaneously rotate the first icon, the line and the second icon in the counterclockwise direction while maintaining the same duration of the time period, wherein
a first image within the first icon is different from a second image within the second icon.

9. The electronic device of claim 8, wherein the first icon is movable along the circular dial for setting a sleep start time based on the first touch input, and the second icon is movable along the circular dial for setting a sleep end time based on the second touch input.

10. The electronic device of claim 9, wherein the sleep start time is settable to a date that is different from a date of the sleep end time by moving one or both of the first icon and the second icon along the circular dial.

11. The electronic device of claim 8, wherein the time period is settable within a 24-hour time range.

12. The electronic device of claim 8, wherein the time period corresponds to a sleep time period.

13. The electronic device of claim 8, wherein the first icon is for setting a sleep start time, and has a preset appearance.

14. The electronic device of claim 8, wherein the second icon is for setting a sleep end time, and has a preset appearance.

15. The electronic device of claim 8, wherein the processor is further configured to execute the instructions to display a numerical value of the start time corresponding to a location of the first icon along the circular dial, and a numerical value of the end time corresponding to the location of the second icon along the circular dial, wherein the numerical values of the start time and the end time are changed according to the locations of the first icon and the second icon along the circular dial, respectively.

16. An electronic device, comprising:
a memory storing instructions;
a touchscreen display; and
one or more processors configured to execute the instructions to:
display, on the touchscreen display, a user interface including a plurality of time points, a first icon positionable at a first point among the plurality of time points based on a touch input thereto, and a second icon positionable at a second point among the plurality of time points based on a touch input thereto,
receive, via the touchscreen display, an input to at least one of the first icon or the second icon for changing a location of the at least one of the first icon or the second icon,
display, on the touchscreen display, a duration time of a time period from a first time corresponding to a first location of the first icon to a second time corresponding to a second location of the second icon,
based on a touch input on a line connected between the first icon and the second icon in a clockwise direction, simultaneously rotate the first icon, the line and the second icon in the clockwise direction while maintaining a same duration of the time period, and
based on a touch input on the line connected between the first icon and the second icon in a counterclockwise direction, simultaneously rotate the first icon, the line and the second icon in the counterclockwise direction while maintaining the same duration of the time period, wherein
a first image within the first icon is different from a second image within the second icon.

17. The electronic device of claim 16, wherein the plurality of time points are arranged along a circumferential direction of a substantially circular dial, the first icon is movable along the circular dial for setting a sleep start time based on a first touch input, and the second icon is movable along the circular dial for setting a sleep end time based on a second touch input.

18. The electronic device of claim 17, wherein the user interface is configured to enable setting of a date of the sleep start time that is different from a date of the sleep end time by moving one or both of the first icon and the second icon along the circular dial.

19. The electronic device of claim 16, wherein the duration time is settable within a 24-hour time range.

20. The electronic device of claim 16, wherein the duration time corresponds to a sleep time period.

21. The electronic device of claim 16, wherein the first icon is for setting a sleep start time, and has a preset appearance.

22. The electronic device of claim 16, wherein the second icon is for setting a sleep end time, and has a preset appearance.

23. The electronic device of claim 16, wherein the one or more processors are configured to execute the instructions to display a numerical value for the first time corresponding to the first location of the first icon, and a numerical value of the second time corresponding to the second location of the second icon, wherein the numerical values of the first time and the second time are changed according to the locations of the first icon and the second icon, respectively.

24. A non-transitory computer-readable medium storing instructions for inputting time period information to a multifunction electronic device comprising a touch-sensitive display and one or more processors, the instructions, when executed by the one or more processors, controlling the electronic device to at least:
- display, on the touch-sensitive display, visual display elements comprising time points and an indicator representing a duration of a time period, the indicator comprising a first icon at one end region of the indicator corresponding to a start time of the time period and a second icon at the other end region of the indicator corresponding to an end time of the time period;
- display, concurrently with the visual display elements, a numerical value for the start time, a numerical value for the end time and a numerical value for the duration;
- based on a first touch input to the first icon for moving the first icon to a first time point, adjust the start time and duration of the time period, and display a numerical value for the start time adjusted by moving the first icon and a numerical value for the duration adjusted by moving the first icon;
- based on a second touch input to the second icon for moving the second icon to a second time point, adjust the end time and duration of the time period, and display a numerical value for the end time adjusted by moving the second icon and a numerical value for the duration adjusted by moving the second icon;
- based on a third touch input on a line connected between the first icon and the second icon in a clockwise direction, simultaneously rotate the first icon, the line and the second icon in the clockwise direction while maintaining a same duration of the time period; and
- based on a fourth touch input on the line connected between the first icon and the second icon in a counterclockwise direction, simultaneously rotate the first icon, the line and the second icon in the counterclockwise direction while maintaining the same duration of the time period, wherein
- a first image within the first icon is different from a second image within the second icon.

* * * * *